O. E. OLESON.
SEPARATOR FOR STEAM AND OIL.
APPLICATION FILED APR. 2, 1917.

1,328,889.

Patented Jan. 27, 1920.
2 SHEETS—SHEET 1.

Witnesses:
Inventor
Olaf E. Oleson,
By Albert C. Bell
Atty

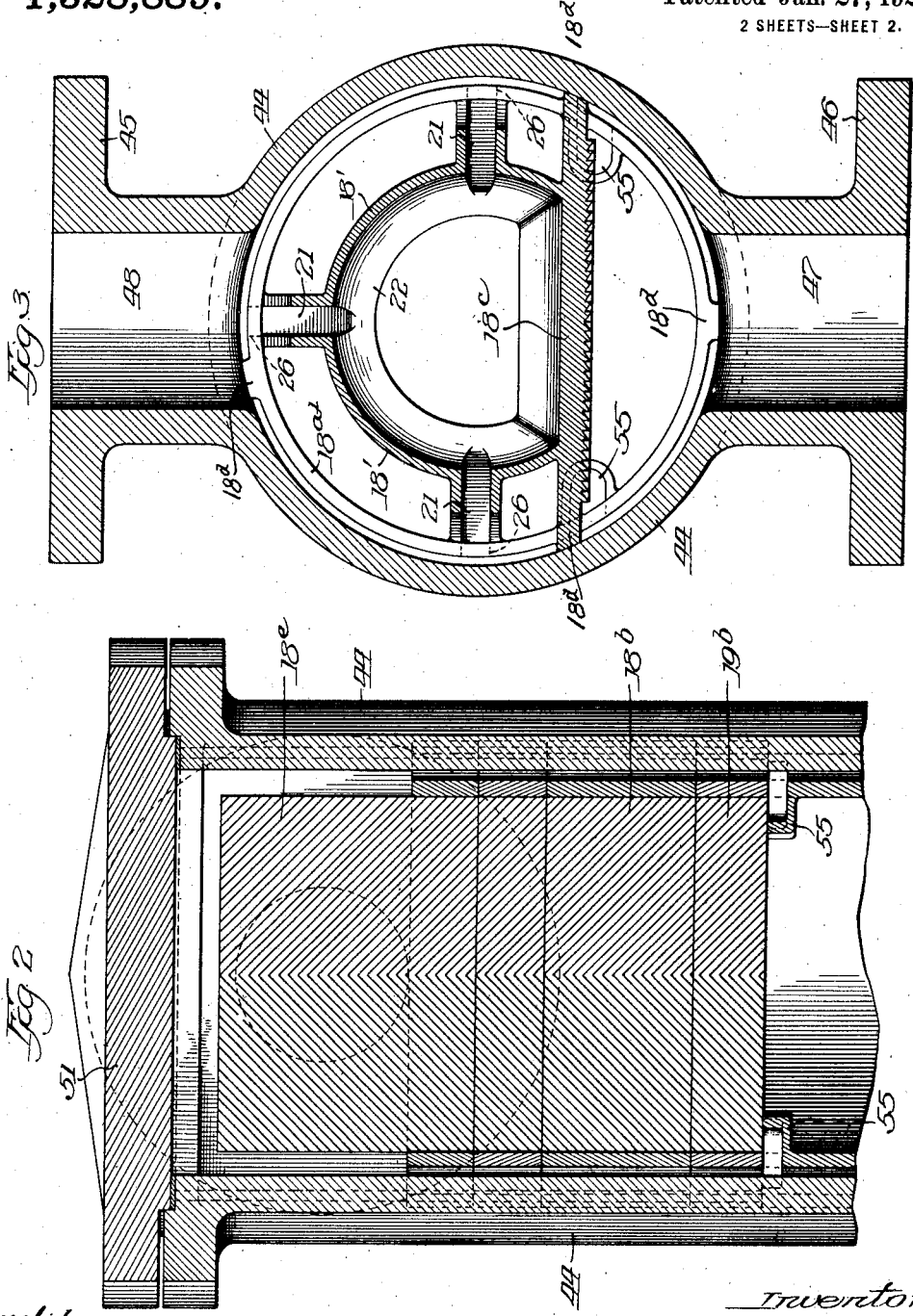

UNITED STATES PATENT OFFICE.

OLAF E. OLESON, OF CHICAGO, ILLINOIS, ASSIGNOR TO THE EDWARD VALVE & MANUFACTURING CO., OF CHICAGO, ILLINOIS, A CORPORATION OF ILLINOIS.

SEPARATOR FOR STEAM AND OIL.

1,328,889.   Specification of Letters Patent.   Patented Jan. 27, 1920.

Original application filed August 24, 1914, Serial No. 858,186. Divided and this application filed April 2, 1917. Serial No. 159,096.

*To all whom it may concern:*

Be it known that I, OLAF E. OLESON, a citizen of the United States, residing at Chicago, in the county of Cook and State of Illinois, have invented a certain new and useful Improvement in Separators for Steam and Oil, of which the following is a specification.

My invention relates to improved steam separators for separating from steam the water entrained therein, either as a result of being carried from the boiler with the steam or having been formed by partial condensation of the steam after leaving the boiler.

It is well known in the art that for certain purposes, such as, for example, the operation of steam turbines, it is necessary to employ dry steam, and my invention provides a construction which is effective for drying steam for this purpose.

My separator also serves to effectively remove from the steam foreign matter, such as mineral matter that may be held in suspension, so that steam delivered from the separator is not only dry but is practically pure. Furthermore, by my construction ample passageways are provided throughout the entire separator so that the steam passes readily therethrough, as a result of which the separator exerts practically no back pressure upon the system.

This is a divisional application of application Serial No. 858,186, filed August 24, 1914, and the present application is limited to the construction of separator design for use in connection with horizontal pipe lines.

The several drawings illustrating my invention are as follows:

Fig. 2 is a vertical sectional view of the parts shown in Fig. 1 taken along the line 2—2, and Fig. 3 is a horizontal sectional view through the parts shown in Fig. 1 taken along the line 3—3.

Similar numerals refer to similar parts throughout the several views.

Figure 1:
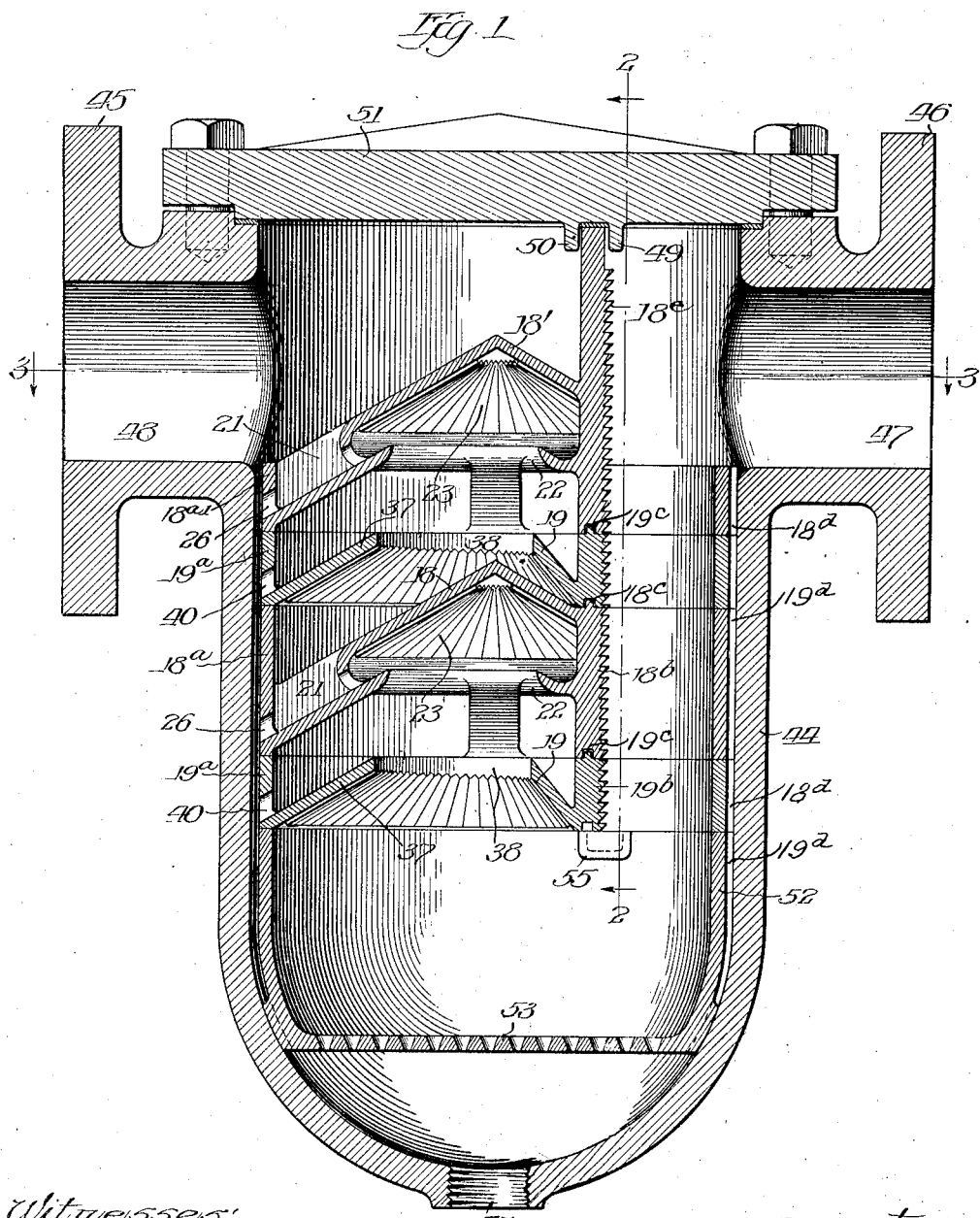
Figure 1 shows in vertical central sectional view the separator as a whole.

As shown in Figs. 1, 2 and 3, the arrangement of the separating units and the construction of these units are similar to that shown and described in my co-pending application above referred to, the difference being that in the present construction the casing is made to permit the use of the separator in a horizontal steam pipe line instead of a vertical pipe line.

As shown in Fig. 1, the separator consists of a casing 44 within which a plurality of separating units is disposed, these units being located one above the other, and these units are arranged in two series, the first of which, 18 and 18' are alternated with the units 19 of the other series. Each of the units 18 and 18' has an outer wall, designated $18^a$ and $18^{a'}$, respectively, of a somewhat less outer diameter than the inner diameter of the vertical cylindrical portion of the casing 44, and this circular wall (which is preferably of cast iron) has extending inwardly and upwardly from it integral troughs 21, supporting, in turn, an integral circular trough 22 concentric with the axis of the separator. The upper edges of the inner ends of the troughs 21 support also the integral conical cover or cap portion 23, which is closed at its upper end and extends downward at its lower end to form the outer wall of the circular trough 22. The under surface of the conical cap or cover 23 is provided with a plurality of corrugated ridges extending substantially in the same direction as the elements of the surface of the conical cap. The upper ends of the troughs 21 open into the circular trough 22, and the lower ends of the corrugated ridges are disposed over the trough 22, as a result of which steam projected upward into the central portion of the separating unit is directed through the opening in the circular trough 22 against the corrugated ridges, and any moisture in the steam is caught and held by said ridges together with the impurities held in suspension in the moist steam. The steam, separated to a greater or less degree from its moisture, passes down around the circular trough 22 between the inclined troughs 21, from which point it is free to pass upward through the separator. The water and impurities collected upon the corrugated ridges run down these ridges and drip from them into the circular trough 22, from which they are delivered by the inclined troughs 21 through outlet openings 26 formed through the cylindrical wall of the separating unit.

Each of the units 19 consists of an outer cylindrical wall 19ª of substantially the same external diameter and thickness as the corresponding wall of the units 18 and 18', and projecting inwardly and upwardly from this cylindrical wall is a conical wall 37 provided with a central circular opening 38, of a diameter somewhat smaller than the external diameter of the conical cap 23. The under surface of the conical wall 37 is provided with a plurality of corrugated ridges substantially parallel with the elements of the conical surface of the wall 37. The cylindrical wall 19ª has extending therethrough just above the lower edge of the wall 37 a plurality of outlet openings 40 for discharging into the annular space between the casing 44 and the cylindrical walls of the separating units any water and foreign matter that may be precipitated upon the upper surfaces of the conical walls 37, and any moisture and impurities precipitated upon the under surface of an upper conical wall 37 are directed by the corrugated ridges on their under surfaces downwardly and outwardly to the inner surface of the cylindrical walls of the separating units upon which surface they drain down upon the upper surface of the next lower conical wall 37 and thus through openings 40 into the collecting chamber provided in the lower part of the separator.

The steam passing upward into engagement with the lowermost conical wall 37 has a path of cross-sectional area which is large compared with the area of the steam pipe, and the velocity of the steam is, therefore, much decreased as it strikes the under surface of the conical wall 37, which facilitates the separation of moisture and impurities from the steam by the corrugated ridges on the under surface of said conical wall. The conformation of this wall directs the steam and any remaining moisture and impurities upward through the central aperture of said conical wall, which aperture directs the steam against the under surface of the conical cap 23 immediately above it, from which the steam and remaining moisture and impurities are discharged, as above described, around the circular trough 22 and into engagement with the next one of the conical walls 37, which, in turn, again directs the steam and remaining moisture and impurities toward the center of the separator and upward against the under surface of the next conical cap 23, from which the steam is delivered practically freed from moisture and impurities to the outlet opening of the separator. While but four separating units are shown in the drawings, it will be understood that a sufficient number is employed to remove the moisture and impurities from the steam, and that whatever number may be employed they are arranged in two series alternating with each other, as described, for the two series of units shown in the drawings.

The casing 44 shown in the drawings is provided with flange couplings 45 and 46 for connecting the separator in the horizontal pipe line, the flange 46 having extending through it into the vertical cylindrical receptacle or casing an inlet opening 47, while the flange 45 has extending through it a similar outlet opening 48.

As more clearly shown in Figs. 1 and 3, each of the units 18 and 19 has formed thereon a vertical wall 18ᵇ and 19ᵇ substantially midway between its center and its outer cylindrical surface, and each of these vertical walls has formed on its upper edge a tongue, as shown at 18ᶜ, 19ᶜ, in Fig. 1, extending into a corresponding groove formed in the lower edge of the similar vertical wall immediately above it, so that the several vertical walls carried by said units may readily be brought into and maintained in alinement with each other to form a continuous vertical wall between the inlet opening 47 and the vertical axis of the separator. The vertical wall 18ᶜ of the uppermost separating unit extends so that its upper edge is substantially in the plane of the top of the casing 44, and this vertical wall is engaged by parallel flanges 49 and 50 extending downward from the cap 51 employed to close the upper end of the casing in the manner indicated. The several vertical walls referred to constitute a practically continuous wall or partition across the casing 44 with an uninterrupted opening between them and the side of each separating unit nearest to the inlet opening 47, as a result of which steam entering said opening is directed downward through said uninterrupted passageway to the bottom of the separator where it enters the lowermost separating unit 52, which is circular in conformation and provided with a wall forming a continuation of the cylindrical wall of the units 18 and 19. The unit 52 is provided with a perforated bottom 53, which facilitates ready passage of moisture and impurities collected in said unit through the bottom thereof into the receptacle provided below said bottom in the lower spherical end in the casing 44, and a threaded connection 54 is provided in the lower end of the casing 44 to drain from the casing any water or oil and impurities that may thus be collected.

The faces of the vertical partitions 18ᵇ, 18ᶜ and 19ᵇ with which the entering steam comes in contact are provided with inclined ridges, as shown in Fig. 2, each ridge having an inclined surface in a plane substantially parallel with the axis of the inlet and outlet openings, and a lower surface inclined to said axis. These inclined ridges start from substantially the middle line of the vertical walls or partitions 18ᵇ, 18ᶜ and 19ᵇ, and extend outward toward the outer edges of the walls, being constructed so as to be continuous across the joints between the walls of adjacent units. These ridges provide a means for engaging a considerable part of the moisture that may be carried by the steam entering the separator and draining it downward and to the outer edges of the walls, together with the impurities that may be carried with said moisture. The upper edge of the lowermost unit 52 is provided with two cups 55 for receiving the moisture and impurities thus collected, which drain down from the outer edges of the said walls into said cups and through the outlet openings in the cylindrical wall of the unit 52 extending into said cups. The steam thus directed into the unit 52 passes upward into the separating units 19 and 18 alternately, and finally through the uppermost separating unit, from which it is discharged from the separator through the outlet opening 48. The several separating units have formed on the outer surface of their cylindrical walls projecting lugs, as shown at 18$^d$, 19$^d$ in Figs. 1 and 3, corresponding lugs of said units being disposed vertically over each other for engaging the inner surface of the casing 44 to hold the separating units in substantially a central position in the casing, thus maintaining a circular clearance space between the outer walls of the separating units and the casing for receiving the separated water and impurities and directing them downward into the receptacle therefor in the lower part of the casing 44.

The separating unit 52 extends downward somewhat into the hemispherical lower end of the casing 44, as a result of which spacing lugs extending outward from the outer surface of the unit 52 rest upon the inner surface of the said hemispherical portion of the casing 44 to carry the weight of the separating units. Inasmuch as the lugs formed on the outer cylindrical surfaces of the various separating units aline these units centrally in the casing 44 and the tongues and grooves formed on the vertical partitions of these separating units maintain the units in proper angular relation to each other, and the uppermost vertical wall 18$^e$ is engaged by the flanges 49 and 50, it will be observed that no extra fastening devices of any kind are required for the separating units to hold them in proper position in the separator or to aline them relatively to each other, but that on the other hand the units may be quickly and readily removed from the separator by removing the cap 51, since the casing of the separator has a practically continuous circular bore, and that the units may be readily reassembled in the casing in proper position without the use of tools of any kind; and, furthermore, assuming that they are placed in the separator in proper alternating arrangement, there is only one relation in which they can be assembled in the separator, and that is, such a proper position angularly that the several tongues and grooves engage each other and that the uppermost vertical wall is disposed between the flanges on the cap 51.

As a result of the construction described, it will be understood that the moisture separated from the steam by the vertical wall is prevented from coming into contact with the steam passing around the lower edge of said vertical wall in the unit 52, which prevents the partially dried steam from again becoming moist before it engages the lowermost separating unit 19. It will also be understood that the annular space provided between the separating units and the casing 44 prevents contact between the steam passing through the separator and the moisture and impurities which may have been taken from the steam by the separating units and discharged through the several outlet openings into said annular space, and thus, inasmuch as contact between the steam entering the separator with moisture previously separated from the steam is, in a large degree, prevented, the operation of the separator is correspondingly effective.

While I have shown my invention in the particular embodiment above described, I do not, however, limit myself to these particular constructions, as I may employ any equivalents thereof known to those skilled in the art without departing from the spirit of my invention.

What I claim is:

1. In a steam separator, the combination of a vertical casing having horizontal inlet and outlet openings, a plurality of separating units disposed in said casing and having outer walls within and separated from said casing, each of said units having a vertical wall at one side of its center within its outer wall, the vertical walls of the units together separating the upper portion of the casing into two parts and directing the steam from the inlet opening into the lowermost separating unit.

2. In a steam separator, the combination of a vertical casing having horizontal inlet and outlet openings, a plurality of separating units disposed in said casing and having outer walls within and separated from said casing, each of said units having a vertical wall at one side of its center within its outer wall, the vertical walls of the units together separating the upper portion of the casing into two parts and directing the steam from the inlet opening into the lowermost separating unit, the lowermost separating unit having a perforated bottom above the bottom of the casing to permit the passage of water into the bottom part of the casing below said perforated bottom.

3. In a steam separator, the combination of a vertical casing having horizontal inlet and outlet openings, a plurality of separating units disposed in said casing and having outer walls within and separated from said casing, each of said units having a vertical wall at one side of its center within its outer wall, the vertical walls of the units together separating the upper portion of the casing into two parts and directing the steam from the inlet opening into the lowermost separating unit, said vertical wall having ridges upon its surface in contact with the entering steam for engaging the moisture contained in the steam to separate it therefrom.

4. In a steam separator, the combination of a vertical casing having horizontal inlet and outlet openings, a plurality of separating units disposed in said casing and having outer walls within and separated from said casing, each of said units having a vertical wall at one side of its center within its outer wall, the vertical walls of the units together separating the upper portion of the casing into two parts and directing the steam from the inlet opening into the lowermost separating unit, said vertical wall having ridges upon its surface in contact with the entering steam for engaging the moisture contained in the steam to separate it therefrom, said ridges extending downwardly in both directions to the outer edges of said vertical wall to direct the separated water to the outer edges of said wall.

5. In a steam separator, the combination of a vertical casing having horizontal inlet and outlet openings, a plurality of separating units disposed in said casing and having outer walls within and separated from said casing, each of said units having a vertical wall at one side of its center within its outer wall, the vertical walls of the units together separating the upper portion of the casing into two parts and directing the steam from the inlet opening into the lowermost separating unit, said vertical wall having ridges upon its surface in contact with the entering steam for engaging the moisture contained in the steam to separate it therefrom, said ridges extending downwardly in both directions to the outer edges of said vertical wall to direct the separated water to the outer edges of said wall, and cups carried by the upper edge of the lowermost separating unit to receive the water collected by said ridges and direct it to the lower part of said receptacle.

6. In a steam separator, the combination of a vertical casing having horizontal inlet and outlet openings, a plurality of separating units disposed in said casing and having outer walls within and separated from said casing, each of said units having a vertical wall at one side of its center within its outer wall, the vertical walls of the units together separating the upper portion of the casing into two parts and directing the steam from the inlet opening into the lowermost separating unit, each of said separating units having an inwardly projecting conical separating wall, alternate ones of said separating walls being closed at their lower edges and open at their upper edges, and intermediate ones of said separating walls being open at their lower edges and closed at their upper edges, and devices for directing the moisture collected by said separating walls to the lower part of said receptacle.

7. In a steam separator, the combination of a vertical casing having horizontal inlet and outlet openings, a plurality of separating units disposed in said casing and having outer walls within and separated from said casing, each of said units having a vertical wall at one side of its center within its outer wall, the vertical walls of the units together separating the upper portion of the casing into two parts and directing the steam from the inlet opening into the lowermost separating unit, said vertical wall having ridges upon its surface in contact with the entering steam for engaging the moisture contained in the steam to separate it therefrom, said ridges extending downwardly in both directions to the outer edges of said vertical wall to direct the separated water to the outer edges of said wall, and cups carried by the upper edge of the lowermost separating unit to receive the water collected by said ridges and direct it to the lower part of said receptacle, each of said separating units having an inwardly projecting conical separating wall, alternate ones of said separating walls being closed at their lower edges and open at their upper edges, and intermediate ones of said separating walls being open at their lower edges and closed at their upper edges, each of said conical separating walls having ridges on its lower surface for increasing the surface of contact of said separating wall with the steam passing through the separator.

8. In a steam separator, the combination of a vertical casing having horizontal inlet and outlet openings, a plurality of separating units disposed in said casing and having outer walls within and separated from said casing, each of said units having a vertical wall at one side of its center within its outer wall, the vertical walls of the units together separating the upper portion of the casing into two parts and directing the steam from the inlet opening into the lowermost separating unit, each of said separating units having an inwardly projecting conical separating wall, alternate ones of said separating walls being closed at their lower edges and open at their upper edges, and intermediate ones of said separating walls being open at their lower edges and closed at their upper edges, each of said intermediate conical separating walls having a circular trough disposed below its lower edge, and a trough or troughs extending from said circular trough for directing the separated moisture to the lower part of said receptacle.

9. In a steam separator, the combination of a vertical casing having horizontal inlet and outlet openings, a vertical wall in said casing separating said inlet and outlet openings and extending from the top of the casing part way to the bottom of the casing, said vertical wall having ridges upon its surface to engage steam brought in contact with it through said inlet opening, said ridges extending downwardly in both directions to the outer edges of said vertical wall to direct the separated water to the outer edges of said wall and a cup below the outer ends of each set of ridges for receiving the moisture therefrom and directing it toward the outer wall of the casing.

10. In a steam separator, the combination of a casing, a plurality of separating units disposed adjacent to each other in said casing, devices carried by said units for locating them in fixed angular relation to each other, and devices carried by the casing and one of said units for locating said unit in a fixed angular position relatively to said casing.

11. In a steam separator, the combination of a vertical cylindrical casing, a plurality of separating units located one above the other in said casing, a cap for inclosing said casing, devices carried by said units for locating them in fixed position angular relatively to each other, and devices carried by the uppermost unit and the cap for locating the uppermost unit in fixed position angularly in the casing.

12. In a steam separator, the combination of a vertical cylindrical casing, a plurality of separating units disposed one above the other in said casing, each of said units having a vertical wall at one side of its center, said vertical walls having tongues and grooves upon their upper and lower edges for locating the units in fixed angular position relatively to each other with their vertical walls in the same plane, and a cap for inclosing the upper end of the casing, said cap having downwardly projecting flanges for engaging the vertical wall of the uppermost unit to locate the same angularly in the casing.

13. In a steam separator, the combination of a cylindrical casing, a plurality of separating units located adjacent to each other in said casing, each unit having an outer cylindrical wall of slightly smaller diameter than the inner diameter of the casing, and lugs rigidly secured to and projecting outwardly from each cylindrical wall for engaging the inner surface of the casing to center the units in said casing and aline them with each other.

14. In a steam separator, the combination of a cylindrical casing, a plurality of separating units located adjacent to each other in said casing, each unit having an outer cylindrical wall of smaller diameter than the inner diameter of the casing, lugs projecting outwardly from each cylindrical wall for engaging the inner surface of the casing to center the units in said casing and aline them with each other, each unit having a vertical wall disposed at one side of its center, and devices carried by said units for locating the units angularly in said casing in fixed position relatively to each other and to the casing with the said vertical walls in the same plane.

In witness whereof, I hereunto subscribe my name this 26th day of March, A. D. 1917.

OLAF E. OLESON.